United States Patent [19]
Oshikiri et al.

[11] Patent Number: 5,406,344
[45] Date of Patent: Apr. 11, 1995

[54] TAKING OPTICAL SYSTEM CAPABLE OF TRIMMING PHOTOGRAHY

[75] Inventors: Minoru Oshikiri; Juro Kikuchi, both of Tokyo, Japan

[73] Assignee: Olympus Optical Co., Ltd., Tokyo, Japan

[21] Appl. No.: 118,242

[22] Filed: Sep. 9, 1993

[30] Foreign Application Priority Data

Sep. 10, 1992 [JP] Japan .................................. 4-241737
Sep. 10, 1992 [JP] Japan .................................. 4-241738

[51] Int. Cl.$^6$ .............................................. G03B 1/18
[52] U.S. Cl. ............................................... 354/195.12
[58] Field of Search ........................ 354/195.1, 195.12

[56] References Cited

U.S. PATENT DOCUMENTS 4,892,396  1/1990  Kushibiki et al. ................... 359/676
5,070,350 12/1991  Harvey ............................ 354/195.1

FOREIGN PATENT DOCUMENTS 4-97326  3/1972  Japan .
55-36833 3/1980  Japan .
4-97325  3/1992  Japan .

OTHER PUBLICATIONS

Patent Abstract of Japan, 63-285524, Nov. 1988, pp. 153-157.

Primary Examiner—David M. Gray
Attorney, Agent, or Firm—Cushman, Darby & Cushman

[57] ABSTRACT

A taking optical system capable of trimming photography, wherein as the trimming magnification increases, the lens performance for the central area of an image frame on a negative film improves, thereby enabling photographs of excellent image quality to be obtained over the entire photography mode range, from ordinary photography to trimming photography. The taking optical system includes a plurality of lens groups arranged to enable at least two photography modes to be changed over from one to the other, the photography modes including a first mode in which a first image forming area is set for photography, and a second mode in which a second image forming area smaller than the first image forming area is set for photography. When the photography mode shifts from the first mode to the second mode, the spacing between the lens groups is changed, thereby effectively correcting aberrations in the second image forming area. Similar aberration correction can also be made by adjusting at least one of the surface configuration, refractive index and refractive index distribution of an optical element of the taking optical system.

4 Claims, 11 Drawing Sheets

TAKING OPTICAL SYSTEM CAPABLE OF TRIMMING PHOTOGRAHY

BACKGROUND OF THE INVENTION

The present invention relates to a taking optical system for a camera. More particularly, the present invention relates to a taking optical system suitable for a camera which is capable of both ordinary photography and trimming photography.

Figure 10A:
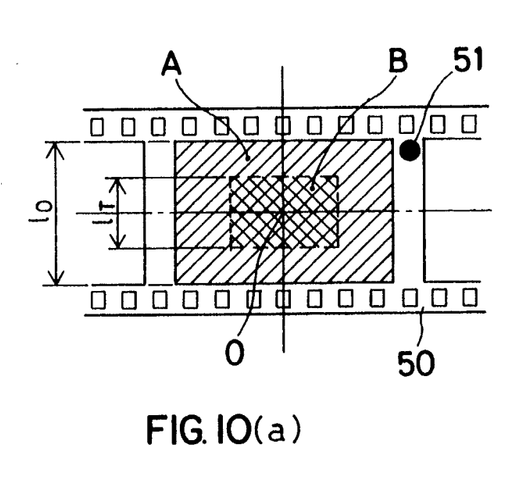
FIGS. 10a and 10b are a view for explanation of trimming photography.
Figure 10B:
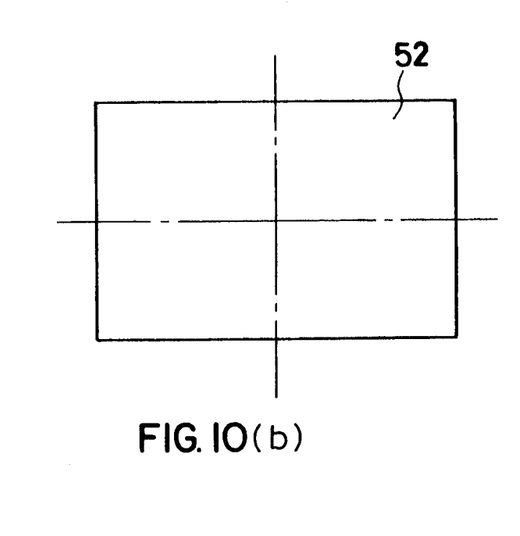

Trimming photography is a photographic method wherein, as shown in FIG. 10(a), a predetermined area B in an ordinary recording area A of a film 50 is enlarged during printing process and printed on a photographic paper 52 of ordinary size as shown in FIG. 10(b), thereby enlarging an image of the region B to obtain a pseudo image which looks as if it had been taken with a telephoto lens having a longer focal length than that of the lens actually used to take the photograph. A typical trimming camera having a trimming system has a device for recording trimming information on a predetermined position 51 of a film or a film cartridge so that a printer can automatically recognize the trimming information from the film used for trimming photography and enlarge the image area B to an appropriate size during printing process. The trimming camera may additionally have a function which enables the user (photographer) to recognize the image area B used for trimming photography through the view finder.

The main trimming information includes the position and size of the trimmed image area. As the trimming size, the ratio of the ordinary recording area A to the trimmed image area B on the film may be used, and this ratio will hereinafter be referred to as trimming magnification. For example, the ratio of the vertical length $l_O$ of the ordinary recording area A, shown in FIG. 10(a), to the vertical length $l_T$ of the trimmed image area B, i.e., $l_O/l_T$, may be called trimming magnification.

In such trimming photography, an image frame can readily be enlarged. However, since the image frame is enlarged by printing process, the image quality, particularly the resolving power, becomes degraded on the resulting print. Roughly speaking, since the image frame is enlarged more than for ordinary photography by the square of the trimming magnification, the resolving power on the print lowers in proportion to the reciprocal of the square of the trimming magnification.

Trimming information writable cameras, in which information indicating a set enlargement area (trimmed image area B) is recorded on the film, have heretofore been proposed in, for example, Japanese Patent Application Laid-Open (KOKAI) Nos. 54-26721, 62-52541, and so forth.

As has been described above, in trimming photography a relatively narrow area on a negative film is enlarged to a predetermined area on a print, and hence the ratio of enlargement in the printing process is relatively high. Accordingly, cameras used for trimming photography must be improved in the performance of the taking lens.

Figures 11A, 11B:
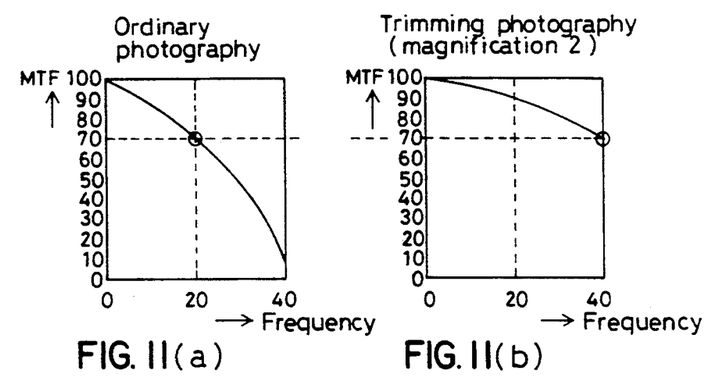
FIGS. 11a and 11b graphically show that the required MTF is higher in trimming photography than in ordinary photography.
Figure 12A:
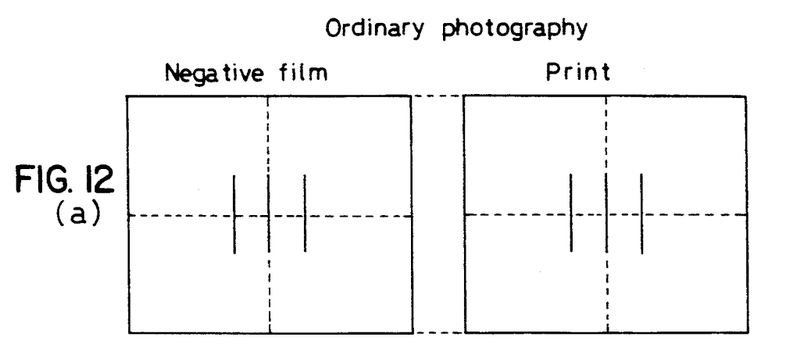
FIGS. 12a and 12b show the way in which MTF changes with printing process.
Figure 12B:
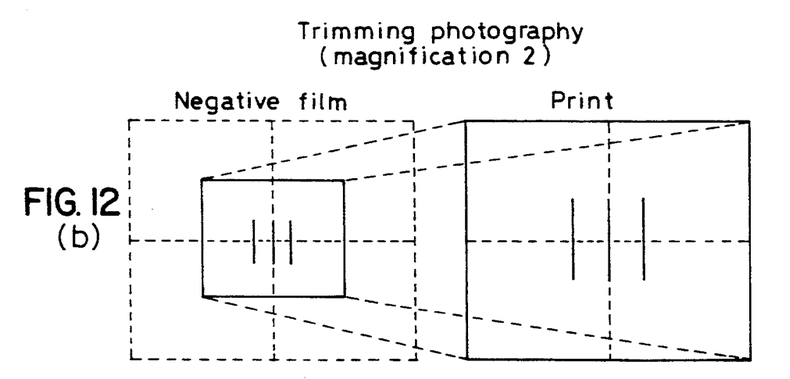

More specifically, if a taking lens has MTF (Modulation Transfer Function) as shown in FIG. 11(a) for ordinary photography, it must have MTF as shown in FIG. 11(b) to obtain a print of the same MTF by trimming photography. This will readily be understood by taking into consideration the difference between the enlargement ratio in the printing process for ordinary photography, shown in FIG. 12(a), and that for trimming photography, shown in FIG. 12(b). It should be noted that in FIGS. 11 and 12 the trimming magnification is assumed to be 2.

Incidentally, Japanese Patent Application Laid-Open (KOKAI) Nos. 63-285524, 04-97326 and 04-97325 disclose techniques whereby, in a single-focus lens of a camera capable of trimming photography, a lens spacing is varied according to trimming to correct the curvature of field, thereby improving the lens performance for the edge area of the image frame.

Japanese Patent Application Laid-Open (KOKAI) No.61-123811 discloses an example of a technique whereby the lens performance for the edge area of the image frame is improved by floating according to the change of field angle, although this is not concerned with trimming. In this example, astigmatism and coma are corrected by varying the spacing of afocal lens elements which are unrelated to zooming, thereby improving the lens performance for the edge area of the image frame.

Meantime, U.S. Pat. No. 5,070,350 discloses an apparatus designed so that since the position of an average optimal image plane of a lens having a field curvature changes according to trimming, the position of the film plane is corrected to the position of the average optimal image plane according to trimming, thereby improving the lens performance for the edge area of the image frame.

On the other hand, Japanese Patent Application Laid-Open (KOKAI) No. 55-36833 discloses a technique of improving the lens performance for the central area of the image frame according to zooming. However, this technique aims at improving the lens performance for the central area of the image frame in the case of macro photography at the long-focus side of zooming and is therefore unrelated to photographic techniques other than macro photography.

The conventional methods of maintaining the desired image quality by improving the off-axis performance according to trimming are effective for lenses which are originally inferior in performance, for example, lenses with which aberrations such as field curvature and coma aberration reach a maximum at an intermediate image height, but not effective for lenses with which off-axis aberrations are gradually aggravated as the image height increases. That is, in Japanese Patent Application Laid-Open (KOKAI) Nos. 63-285524, 04-97326 and 04-97325, although the lens performance for the edge area of an image frame on a negative film improves, the lens performance for the central area of the image frame does not improve. Therefore, as the trimming magnification increases, the lens performance for the central area steadily lowers.

In addition, U.S. Pat. No. 5,070,350 suffers from the problem stated below. In a lens having a large field curvature, the average optimal image plane and the optimal image point in the center approach each other as the trimming magnification increases, and thus the lowering of the lens performance for the central area is reduced. However, since the lens performance for the central area is originally inferior, excellent image quality cannot be obtained after all.

Although Japanese Patent Application Laid-Open (KOKAI) No. 55-36833 discloses a technique whereby the lens performance for the central area is positively improved, this technique aims at improving the lens performance for the central area in the case of macro photography at the long-focus side of zooming and is therefore unrelated to photographic techniques other than macro photography, as described above.

SUMMARY OF THE INVENTION

In view of the above-described circumstances, it is an object of the present invention to provide a taking optical system capable of obtaining photographs of excellent image quality over the entire photography mode range, from ordinary photography to trimming photography, without adopting the above-described conventional foolish method in which the image quality is set to a relatively low level from the beginning in order to eliminate the disadvantage that the quality of the trimmed image lowers. More specifically, the object of the present invention is to provide a camera having such a lens that as the trimming magnification increases, spherical and other aberrations are reduced to improve the lens performance for the central area of an image frame on a negative film, and a mechanism for controlling the lens.

To attain the above-described object, the present invention provides a taking optical system capable of trimming photography which includes a plurality of lens groups arranged to enable at least two photography modes to be changed over from one to the other, the photography modes including a first mode in which a first image forming area is set for photography, and a second mode in which a second image forming area smaller than the first image forming area is set for photography. When the photography mode shifts from the first mode to the second mode, the spacing between the lens groups is changed so that the angle $\omega_x$ between an axial bundle of rays and the optical axis in the lens spacing and the angle $\omega_k$ between the bundle of rays incident on an image surface and the optical axis satisfy the following relationship, thereby effectively correcting aberrations in the second image forming area:

$$|\sin \omega_x / \sin \omega_{k/b}| > 0.1$$

In addition, the present invention provides a taking optical system capable of trimming photography which includes a plurality of lens groups arranged to enable at least two photography modes to be changed over from one to the other, the photography modes including a first mode in which a first image forming area is set for photography, and a second mode in which a second image forming area smaller than the first image forming area is set for photography. When the photography mode shifts from the first mode to the second mode, the spacing between the lens groups is changed. Moreover, the spacing that changes according to the mode change is provided at each of at least two positions respectively set in front of and behind an aperture, thereby effectively correcting aberrations in the second image forming area.

In addition, the present invention provides a trimming camera having a taking lens and capable of trimming photography. The taking lens includes an optical element at least one of constituent elements of which is variable. The camera further includes a device for recognizing trimming information including trimming magnification, and a control driving device for controlling at least one of surface configuration, refractive index and refractive index distribution of the optical element so that the axial spherical aberration of the taking lens decreases as the trimming magnification recognized by the trimming information recognizing device increases.

The camera may additionally be provided with a second control driving device for correcting the displacement of the best image surface from the film plane during trimming photography.

The following is a description of the reasons for employing the above-described arrangements and the functions of the arrangements.

First, the above-described first and second taking optical systems will be explained. Regarding a lens with which the field curvature is gradually aggravated as the image height increases in the lens performance for ordinary photography, if trimming is effected using such a lens with its lens performance left unchanged, aberrations such as chromatic aberration of magnification, distortion and field curvature, which increase as the field angle increases, naturally decrease because the field angle becomes small in trimming photography. Since the rate of reduction of such aberrations exceeds the rate of increase of the enlargement ratio during printing process, the aberrations are reduced by trimming.

However, spherical and coma aberrations, including their wavelength dependence (chromatic aberrations), do not change even if trimming is made, these aberrations increase on the print due to the increase in the enlargement ratio during printing process.

Accordingly, it is necessary to use such a lens that as the trimming magnification increases, the spherical and coma aberrations (including their chromatic aberrations) are reduced, thereby improving the lens performance for the central area of the image frame on the negative film.

Figure 1A:
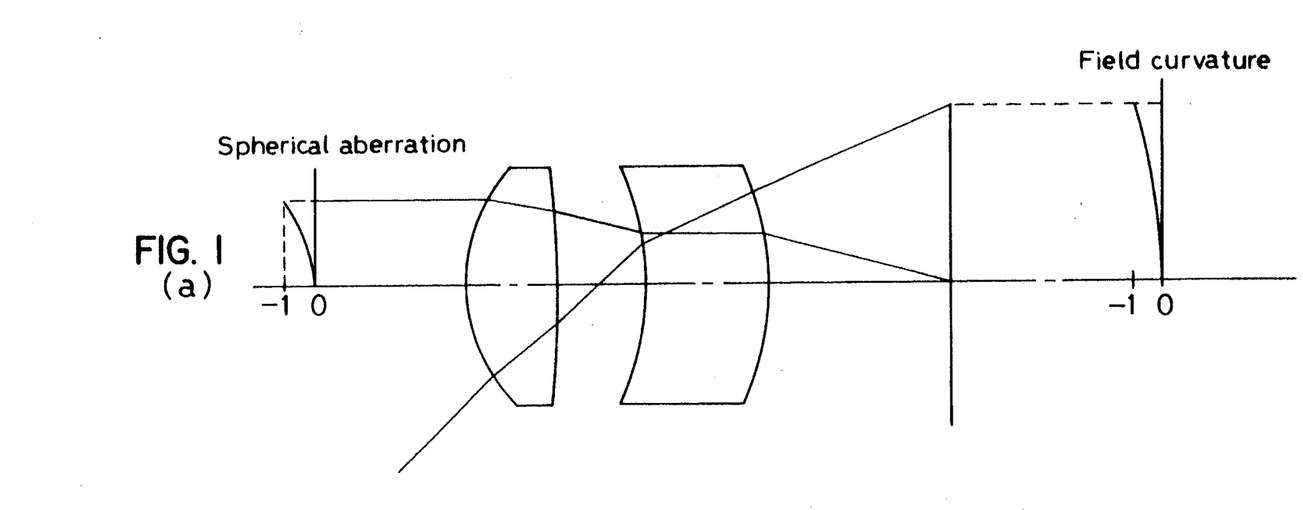
FIGS. 1a and 1b are a sectional view showing the concept of the taking optical system according to the present invention.
Figure 1B:
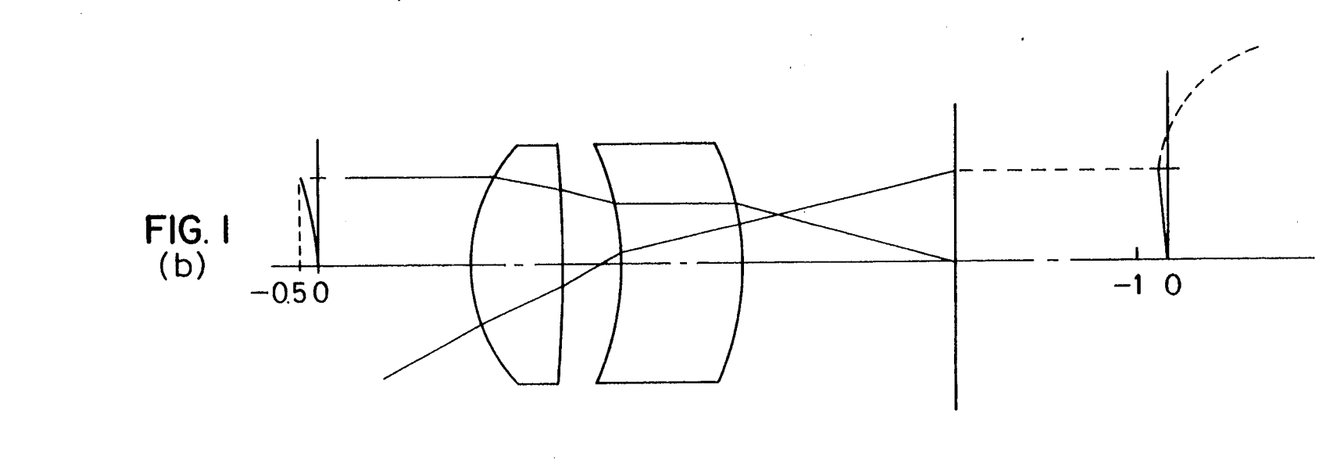

The concept of the taking optical system of the present invention that satisfies the above requirements is shown in FIG. 1. FIG. 1(a) shows the state of the taking optical system during ordinary photography, and FIG. 1(b) shows the state of the taking optical system during trimming photography. In the illustrated example, the lens system is divided into two lens groups, and the spacing between the two lens groups is changed under control.

In this example, during ordinary photography, the spacing between the two lens groups is set relatively wide, and the height of off-axis rays entering the second lens group is changed for each image height, thereby effectively correcting off-axis aberrations. During trimming photography, the spacing between the two lens groups is set relatively narrow to increase the height at which the axial rays enter the front surface of the second lens group from the object side, thereby changing the angle at which the rays enter the front surface, and thus reducing the spherical aberration during trimming photography.

Even if the field curvature is aggravated in the ordinary photography area by the change of the spacing, the object of the present invention can be satisfactorily attained as long as the field curvature is not aggravated in the trimmed image area.

To correct spherical and coma aberrations by floating as in the present invention, it is necessary for the axial marginal rays to be at a certain angle to the optical axis in the spacing between the lens groups. It means that since the spherical aberration is corrected by changing the spacing, the angle at which the axial rays enter surfaces respectively lying in front of and behind the spacing must change in accordance with the change of the spacing. In other words, it is necessary that at least one of the surfaces, which are respectively located in front of and behind the spacing, should be a curved surface and that the axial rays should not be parallel to the optical axis in the spacing. It is difficult to give a definition of the fact that the axial rays are not parallel to the optical axis. However, it is necessary that, in the x-th spacing from the object side that is changed according to the mode change from ordinary photography to trimming photography, the angle $\omega_x$ between an axial bundle of rays and the optical axis and the angle $\omega_k$ between the bundle of rays incident on the image surface and the optical axis satisfy at least the following relationship:

$|\sin \omega_x / \sin \omega_k| > 0.1$

Furthermore, to minimize the amount of change of the spacing according to the mode change, it is desirable for the above-described two angles to satisfy the following relationship:
$|\sin \omega_x / \sin \omega_k| > 1.0$ However, if the value of the left-hand side of the above inequality is excessively large, the required production accuracy becomes strict, resulting in a lowering of the productivity. Accordingly, it is desirable that the value of the left-hand side of the inequality should not exceed 20.

It is desirable for the field curvature to lie in the direction for correction, as a matter of course. However, the field curvature may be left as it is as long as it is not aggravated in the image area to be printed.

In addition, it is preferable to change the spacing in the direction in which the focal length increases.

Furthermore, to correct not only spherical aberration but also other aberrations such as field curvature, or to maintain such aberrations at predetermined values, it is preferable to change a plurality of spacings.

In a case where a plurality of spacings are changed, it is often preferable to set these spacings in front of and behind an aperture because there are cases where the amounts of change of axial aberrations in front of and behind the aperture have the same sign, whereas the amounts of change of off-axis aberrations have different signs, and where the relationship between the signs of the amounts of change of the axial aberrations and those of the off-axis aberrations is reverse to the above.

Figure 2:
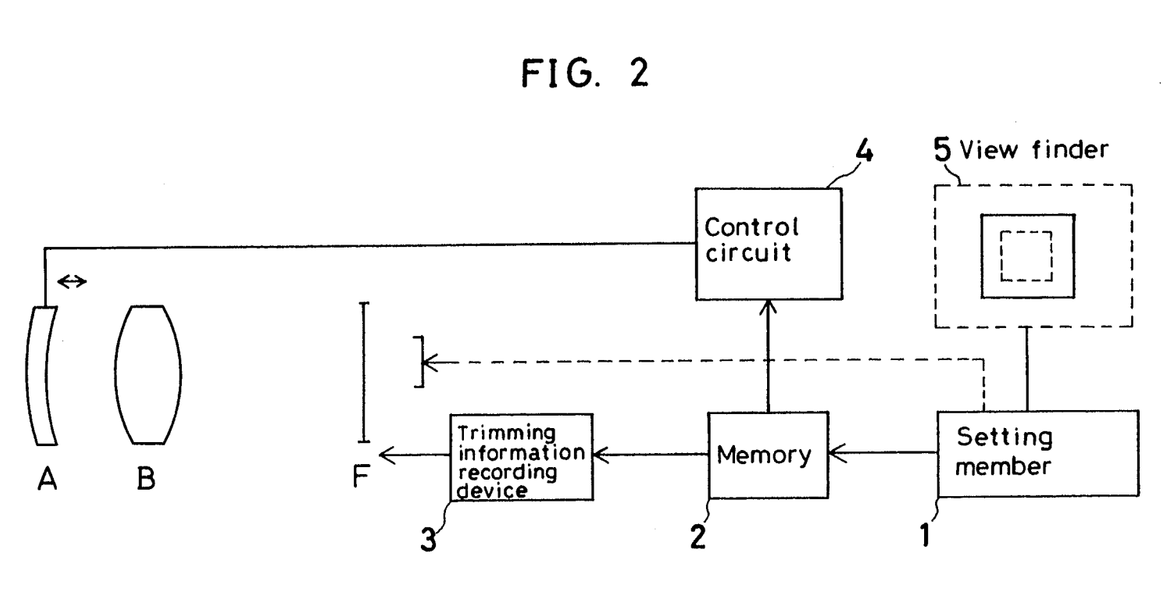
FIG. 2 is a block diagram of a control system used for trimming photography.
Figure 3A:
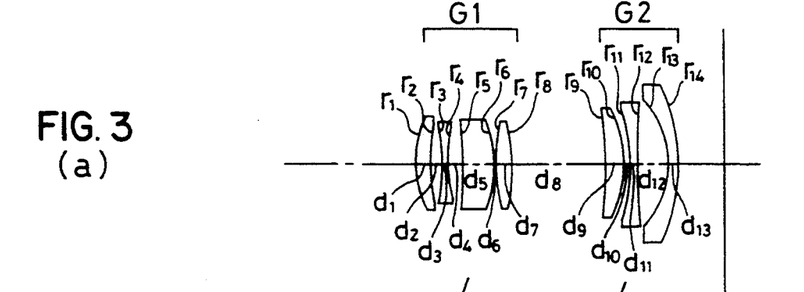
FIGS. 3a-3d is a sectional view of an optical system according to a first embodiment of the present invention.
Figure 3B:
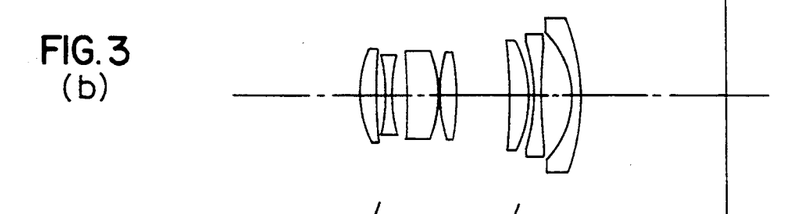
Figure 3C:
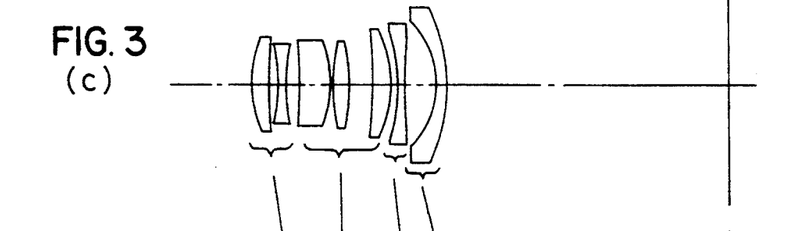
Figure 3D:
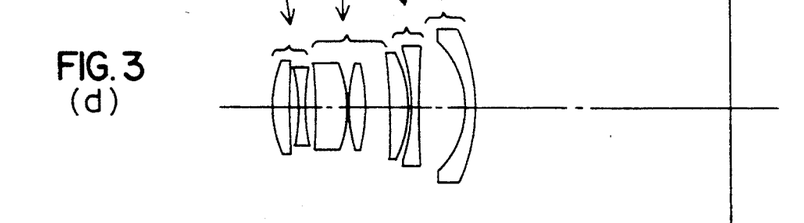

FIG. 2 shows a control system for trimming photography. In the figure, a setting member 1 is adapted to enable the photographer to set a plurality of trimming ranges and to determine one of them. The trimming range in a view finder 5, which is formed of a liquid crystal, for example, changes in linked relation to the operation of the setting member 1. The trimming range thus determined is converted into an electric signal and stored in a memory 2. A trimming information recording device 3 writes information on a film F on the basis of the information stored in the memory 2 and in accordance with a predetermined standard. Before a photograph is actually taken, a control circuit 4 moves a lens group A for effecting aberration correction within the trimming range on the basis of the information stored in the memory 2. It should be noted that the lens group A can also be moved in linked relation to the trimming range setting member 1, as a matter of course.

Figures 6A, 6B:
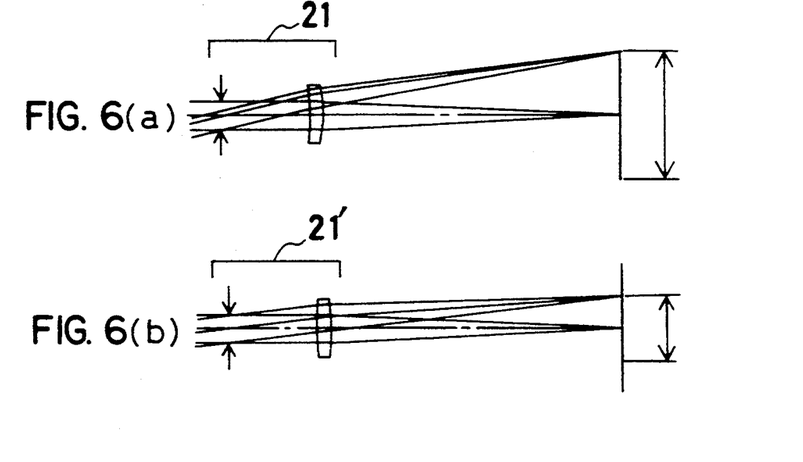
FIGS. 6a and 6b are an optical path diagram showing the second embodiment during ordinary photography and also during trimming photography.
Figure 7A:
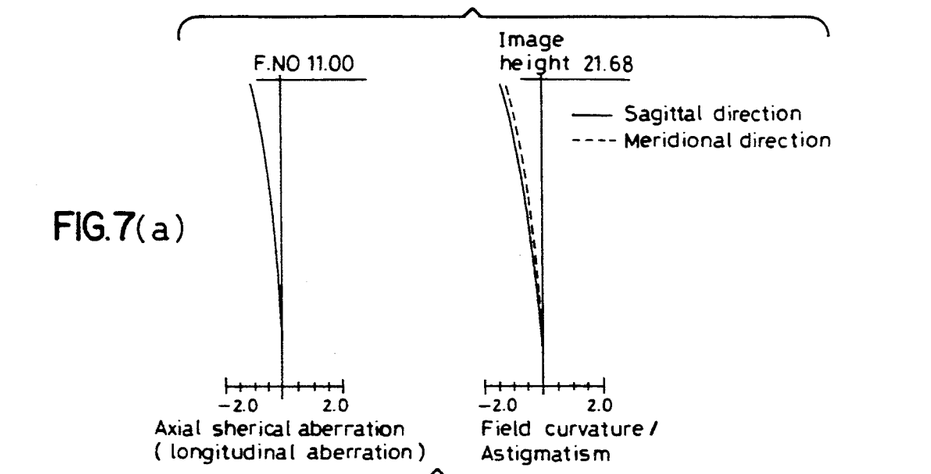
FIGS. 7a and 7b graphically show aberrations of the second embodiment during ordinary photography and also during trimming photography.
Figure 7B:
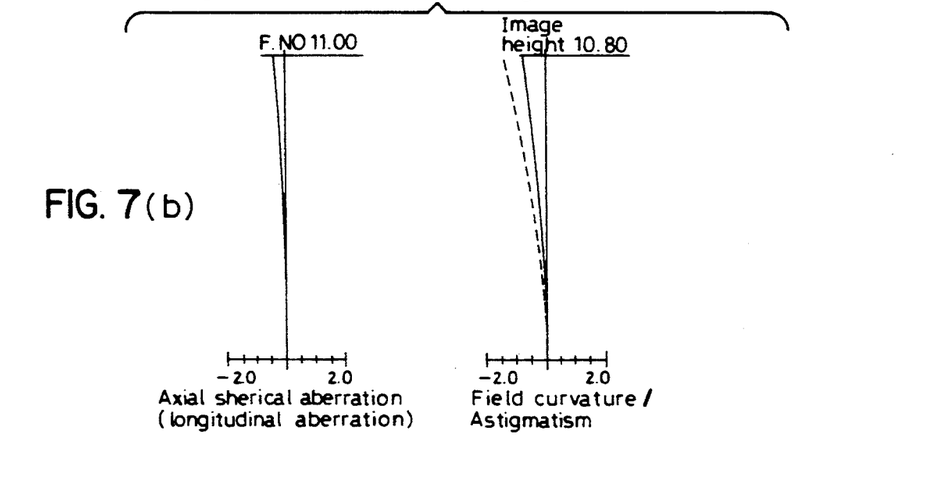

Next, the trimming camera of the present invention will be explained. FIG. 6(a) is an optical path diagram showing the state of the optical system of the trimming camera during ordinary photography. A taking lens 21 is generally designed to be capable of obtaining an adequately good image over the entire ordinary photography area A (FIG. 10), from the center 0 to the edge portions thereof. In other words, in order to improve the lens performance for the edge area, the lens performance for the central area, that is, correction of axial spherical aberration, is sacrificed to a certain extent, as will be clear from FIG. 7(a), which graphically shows aberrations. However, the image frame used for trimming photography is a region B that includes the center O of the ordinary photography area A on the film 50, shown in FIG. 10(a), which is smaller than the area A. Accordingly, during trimming photography, the axial spherical aberration, the correction of which is sacrificed during ordinary photography, is corrected even more effectively in place of the lens performance for the edge area, which is unnecessary for trimming photography, thereby making it possible to prevent lowering in resolving power on the resulting print. The correction of the axial spherical aberration can be made by changing the constituent elements of the taking lens, that is, the curvature radius, surface separation, refractive index and refractive index distribution of the taking lens. FIG. 7(b) graphically shows aberrations when the optical system shown in FIG. 6(a) is changed for trimming photography such that the curvature radius of the lens is changed for a trimming magnification of 2. FIG. 6(b) is an optical path diagram showing the optical system thus changed.

By minimizing the axial spherical aberration to increase the resolving power on the film plane as described above, it is possible to minimize the lowering of the resolving power due to trimming.

Incidentally, the curvature radius, which is one of the lens constituent elements, can be made variable by using an elastomeric lens whose surface configuration is variable, as described in, for example, U.S. Pat. No. 4,892,396. It should be noted that the same function can be attained not only by directly changing the curvature or other surface configuration but also changing the refractive index distribution of a lens having a refractive index distribution in concentrical relation to the optical axis, which is equivalent to the former. Known lenses of the type described above include one that comprises a liquid crystal and electrodes which are disposed thereon in the form of concentrical rings, as disclosed in, for example, Japanese Patent Application Laid-Open (KOKAI) Nos. 03-4211 and 03-2840. Alternatively, the refractive index, which is one of the lens constituent elements, may be made variable, and this can readily be realized by using the above-described lens utilizing a liquid crystal.

Furthermore, it is preferable to combine together two or more lenses having the above-described characteristics and to adjust simultaneously the characteristics of the lenses at the time of trimming photography. The reason for using two or more lenses is that the correction of the axial spherical aberration is facilitated and it is possible to maintain the focal length, back focus, etc. at predetermined values.

In addition, it is preferable with a view to preventing lowering of the resolving power to provide a control driving mechanism for moving a part or the whole of the lens or the film along the optical axis to correct the displacement of the best image surface, which may occur during the correction of the axial spherical aberration at the time of trimming photography.

It should be noted that if the trimming magnification can take a plurality of values or a continuous value in the above-described arrangements, one or all of the constituent elements of the taking lens, i.e., curvature radius, surface separation, refractive index, and refractive index distribution, is varied by an amount most suitable for each trimming magnification. The amount of movement of the lens or the film caused to correct the displacement of the best image surface is also adjusted to an amount most suitable for each trimming magnification.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some embodiments of the taking optical system capable of trimming photography according to the present invention will be described below.

FIG. 3 is a sectional view of the optical system of a first embodiment of the present invention: in which (a) shows the optical system in a WIDE position; (b) shows the optical system in a standard position; (c) shows the optical system in a TELE position; and (d) shows the optical system in a state wherein it is in the TELE position and trimming is made at a trimming magnification of 2. In this embodiment, the present invention is applied to a zoom lens having two lens groups, that is, a first positive lens group G1 and a second negative lens group G2. The first lens group G1 includes 4 lenses, that is, a positive meniscus lens which is convex toward the object, a concave lens with two concave surfaces, a positive meniscus lens which is convex toward the image surface, and a convex lens with two convex surfaces. The second lens group G2 includes 3 lenses, that is, a positive meniscus lens which is convex toward the image surface, a concave lens with two concave surfaces, and a negative meniscus lens which is convex toward the image surface. For ordinary photography, the spacing between the two lens groups is varied as illustrated to effect zooming in accordance with the specifications: focal length 39.3 to 77.2; field angle 57.6° to 31.3°; and F-number 4.7 to 6.6. During trimming photography, three spacings other than the zoom spacing are changed with the optical system set in the TELE position.

Figure 4A:
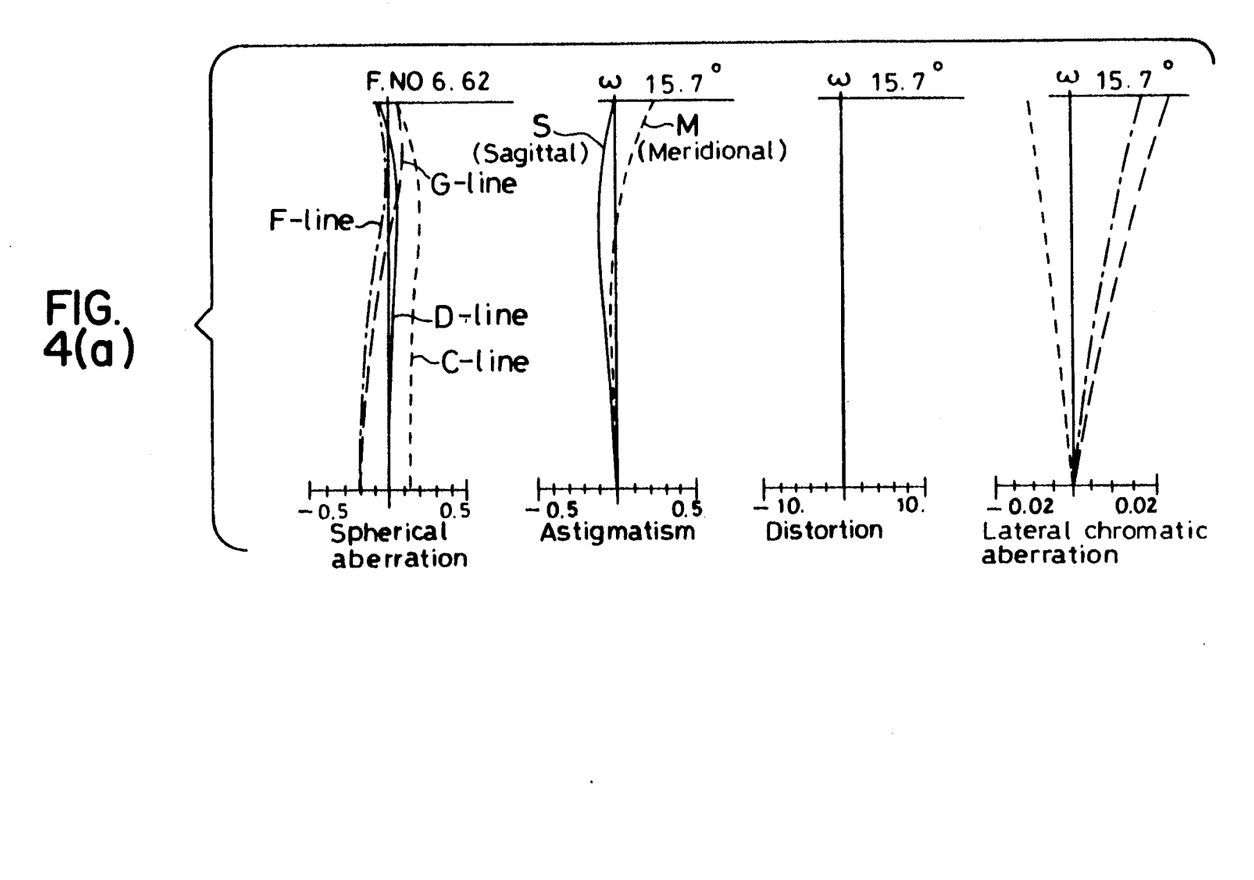
FIGS. 4a-4c graphically show aberrations of the optical system of the first embodiment.
Figure 4B:
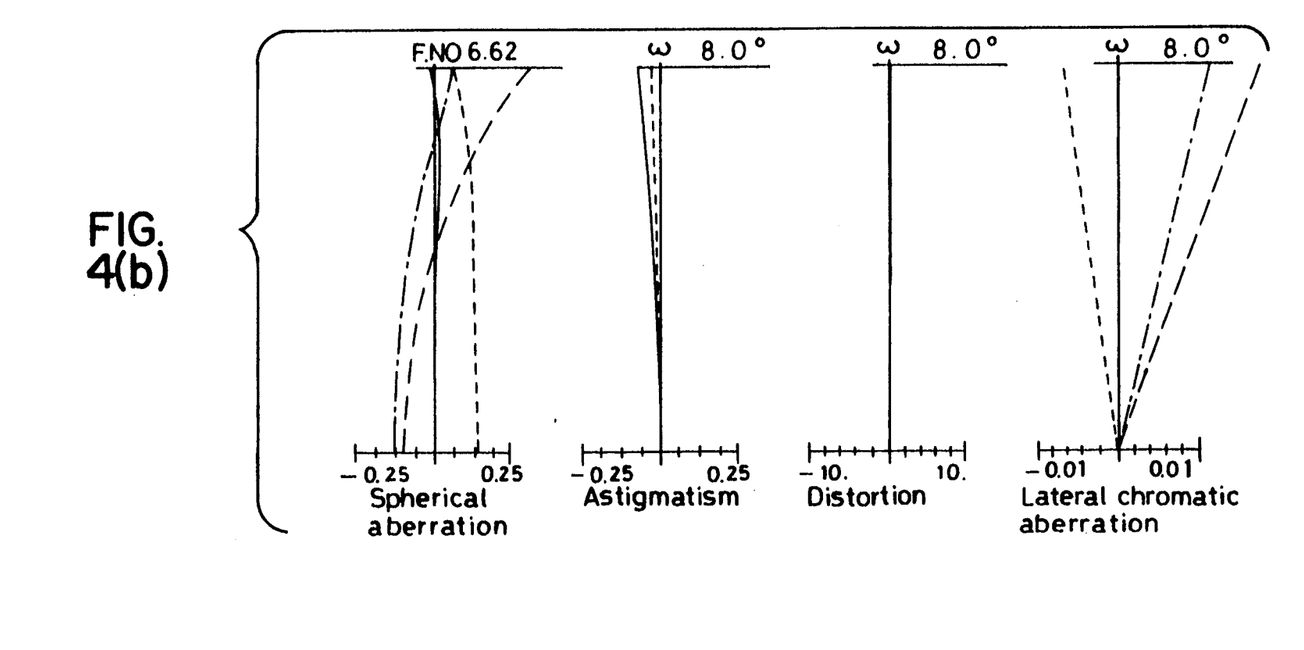
Figure 4C:
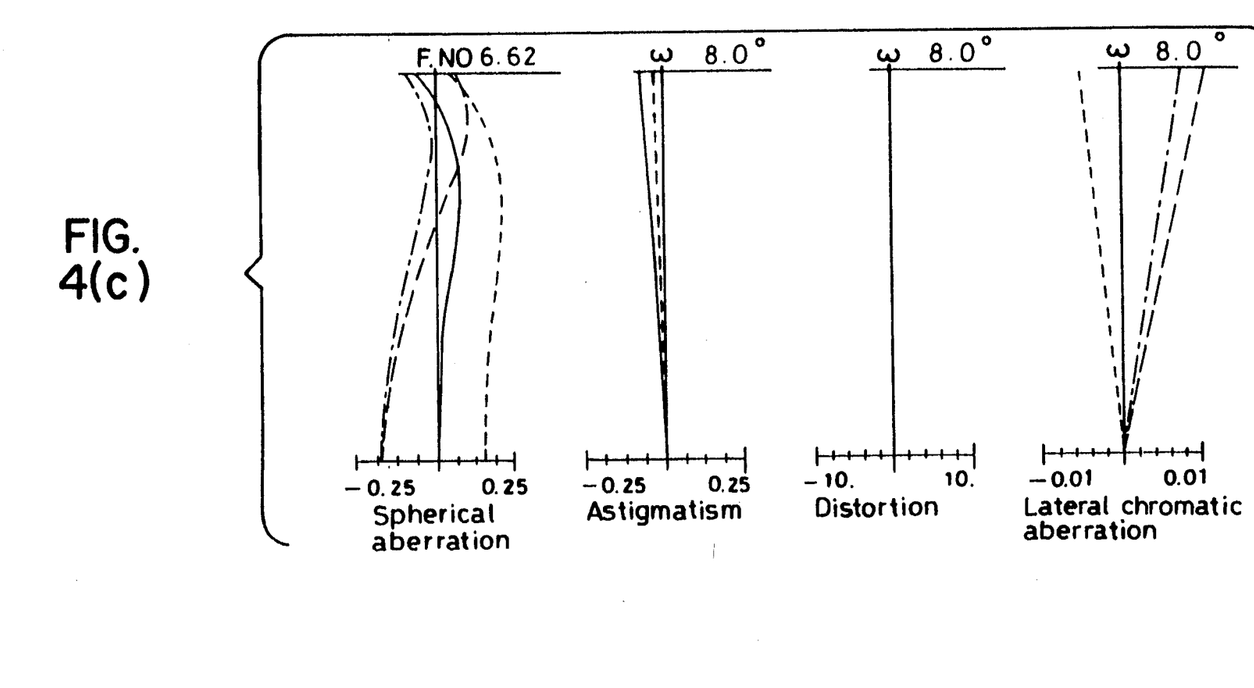

FIG. 4 graphically shows spherical aberration, astigmatism, distortion and lateral chromatic aberration in this embodiment. In FIG. 4: (a) shows the aberrations in the embodiment when the optical system is set in the TELE position; (b) shows the aberrations when the optical system is subjected to floating in the TELE position to make trimming at a trimming magnification of 2; and (c) shows the aberrations when trimming is made at a trimming magnification of 2 in the TELE position without floating. As will be clear from these graphs, even if trimming is made at a trimming magnification of 2, the spherical aberration is corrected so that better performance is obtained, although the former performance cannot completely be recovered. On the other hand, the field curvature does not change even if floating is carried out. However, it will be understood that since the field angle becomes small, the field curvature consequently becomes small.

In this embodiment, as will be clear from lens data shown below, the spacing $DT_3$ is changed for aberration correction, which has a large effect on the spherical aberration but makes a minimal effect on the field curvature when the spacing is changed. Although the spherical aberration can sufficiently be corrected simply by changing the spacing $DT_3$, the spacings $DT_1$ and $DT_2$ are also changed with a view to increasing the amount of correction of the spherical aberration without affecting the field curvature. These two spacings respectively lie in front of and behind the aperture, and for a given amount of change made in accordance with trimming, the amounts of change of spherical aberration in front of and behind the aperture have the same sign, whereas the amounts of change of field curvature in front of and behind the aperture have different signs. Therefore, by changing the spacings $DT_1$ and $DT_2$, it is possible to enhance the effectiveness of spherical aberration correction and, at the same time, to maintain the field curvature at a constant level.

Lens data in this embodiment will be shown below. Symbols denote as follows: f is the focal length of the whole system; $F_{NO}$ is F-number; $r_1, r_2\ldots$ are the curvature radii of the lens surfaces; $d_1, d_2\ldots$ are the spacings between the lens surfaces; $n_{d1}, n_{d2}\ldots$ are the refractive indices at D line of the lenses; and $V_{d1}, V_{d1}, V_{d2}\ldots$ are Abbe's numbers of the lenses.

First embodiment:

$f = 39.3 \sim 55.1 \sim 77.2$
$F_{NO} = 4.7 \sim 5.6 \sim 6.6$

| | | | |
|---|---|---|---|
| $r_1 = 18.64$ | $d_1 = 2.6$ | $n_{d1} = 1.7130$ | $\nu_{d1} = 53.8$ |
| $r_2 = 86.48$ | $d_2 = 1.5$ | | |
| $r_3 = -23.83$ | $d_3 = 1.0$ | $n_{d2} = 1.8340$ | $\nu_{d2} = 37.2$ |
| $r_4 = 34.25$ | $d_4 = DT_1$ | | |
| $r_5 = -140.86$ | $d_5 = 5.3$ | $n_{d3} = 1.5796$ | $\nu_{d3} = 53.7$ |
| $r_6 = -18.83$ | $d_6 = 0.2$ | | |
| $r_7 = 37.73$ | $d_7 = 2.6$ | $n_{d4} = 1.5182$ | $\nu_{d4} = 59.0$ |
| $r_8 = -37.73$ | $d_8 = DZ$ | | |
| $r_9 = -148.67$ | $d_9 = 3.1$ | $d_{d5} = 1.5317$ | $\nu_{d5} = 48.9$ |
| $r_{10} = -20.00$ | $d_{10} = DT_2$ | | |
| $r_{11} = -31.40$ | $d_{11} = 1.3$ | $n_{d6} = 1.7725$ | $\nu_{d6} = 49.7$ |
| $r_{12} = 318.05$ | $d_{12} = DT_3$ | | |
| $r_{13} = -13.34$ | $d_{13} = 1.6$ | $n_{d7} = 1.7292$ | $\nu_{d7} = 54.7$ |
| $r_{14} = -31.00$ | | | |

Zoom spacing:

| f | 39.3 | 55.1 | 77.2 |
|---|---|---|---|
| DZ | 14.97 | 8.45 | 3.80 |

Floating spacing:

| | Ordinary photography | Trimming photography |
|---|---|---|
| $DT_1$ | 2.06 | 1.62 |
| $DT_2$ | 0.90 | 0.50 |
| $DT_3$ | 5.25 | 7.48 |

Figure 5:
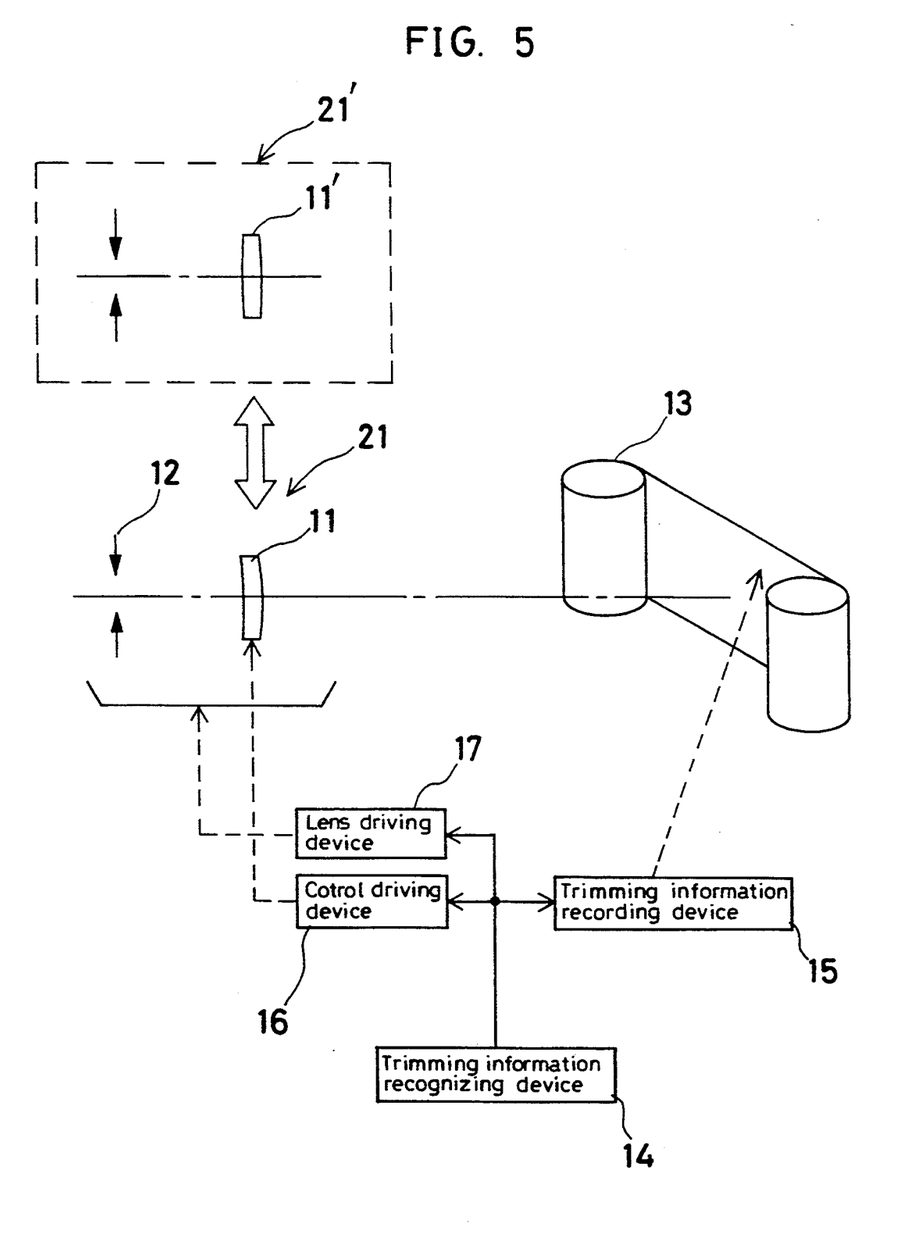
FIG. 5 schematically shows a trimming camera provided with a taking optical system according to a second embodiment of the present invention.

$x = 1;\ |sin\omega_x/sin\omega_k| \approx 1.99$
$x = 2;\ |sin\omega_x/sin\omega_k| \approx 4.09$
$x = 3;\ |sin\omega_x/sin\omega_k| \approx 2.38$ Next, a second embodiment of the present invention will be explained. FIG. 5 schematically shows a trimming camera provided with a taking optical system according to a second embodiment of the present invention. FIG. 6 is an optical path diagram showing the second embodiment. FIG. 7 graphically shows aberrations in the second embodiment. The second embodiment is a trimming camera including the following main constituent elements: a taking lens 21 having an elastomeric lens 11 whose surface configuration is variable, and an aperture 12; a film 13 having a portion 51 (see FIG. 10) provided at a predetermined position on the film or a film cartridge to record trimming information; a trimming information recognizing device 14 for recognizing the present trimming state of the camera; a trimming information recording device 15 for recording the recognized trimming information on the recording portion 51 of the film 13; a control driving device 16 for changing the surface configuration of the elastomeric lens 11 to reduce the axial spherical aberration as the trimming magnification in the trimming information increases; and a lens driving device 17 for moving the taking lens 21 along the optical axis to correct the displacement of the best image surface caused by the change of the axial spherical aberration and the change of the back focus.

The trimming camera has a series of operations as follows:

When the trimming camera-enters a trimming photography state, the trimming information is recognized by the trimming information recognizing device 14. The trimming information recognized by the trimming information recognizing device 14 is first transmitted to the trimming information recording device 15. The trimming information is recorded on the recording portion 51 of the film 13 by the trimming information recording device 15 to automatically transfer the trimming information to a printer so that the image concerned will be enlarged with an appropriate enlargement ratio when the film 13 is printed. Further, the trimming information is sent from the trimming information recognizing device 14 to the control driving device 16 to change the surface configuration of the elastomeric lens 11 in order to reduce the axial spherical aberration according to the trimming magnification so that the lowering of resolving power on the print will be minimized when the film 13 is printed. Thus, the surface configuration of the elastomeric lens 11 is optimized. Reference numerals 11' and 21' in FIGS. 5 and 6 show the surface configuration of the elastomeric lens and the taking lens itself when the trimming magnification is 2. Meantime, the best image surface is displaced from the film plane because of the reduction of the axial spherical aberration and the change of the back focus. Therefore, the trimming information is sent from the trimming information recognizing device 14 to the lens driving device 17 for moving the taking lens 21 along the optical axis to correct the displacement of the best image surface. Thus, the taking lens 21 is moved.

Table 1(a) below shows lens data when the trimming magnification is 1, that is, at the time of ordinary photography. Table 1(b) below shows lens data when the trimming magnification is 2. FIG. 7(a) graphically shows aberrations when the trimming magnification is 1. FIG. 7(b) graphically shows aberrations when the trimming magnification is 2.

TABLE 1(a)

Focal length 100 mm, F-number 11,
Maximum image height 21.6 mm

| Surface No. | Curvature radius (mm) | Surface separation (mm) | Refractive index |
|---|---|---|---|
| Aperture | — | 30 | 1 |
| 1 | −454.07 | 5 | 1.51633 |
| 2 | −46.54 | 100.4 | 1 |
| Film plane | — | — | — |

TABLE 1(b)

Focal length 100 mm, F-number 11,
Maximum image height 10.8 mm (trimming magnification 2)

| Surface No. | Curvature radius (mm) | Surface separation (mm) | Refractive index |
|---|---|---|---|
| Aperture | — | 30 | 1 |
| 1 | 90.91 | 5 | 1.51633 |
| 2 | −117.27 | 98.1 | 1 |
| Film plane | — | — | — |

As will be clear from the graphs (a) and (b) of FIG. 7, since the trimming magnification is 2, the maximum image height is 10.8 mm. Accordingly, the lens performance for the edge area can be sacrificed for better correction of the axial spherical aberration. Thus, the axial spherical aberration decreases to about ¼ in terms of longitudinal aberration. According to simple calculation, the resolving power on the film quadruples, and the resolving power on the print doubles. There is no lowering of the resolving power due to trimming photography; rather, there is an improvement in the resolving power. Moreover, the F-number need not be increased therefor.

Figure 8:
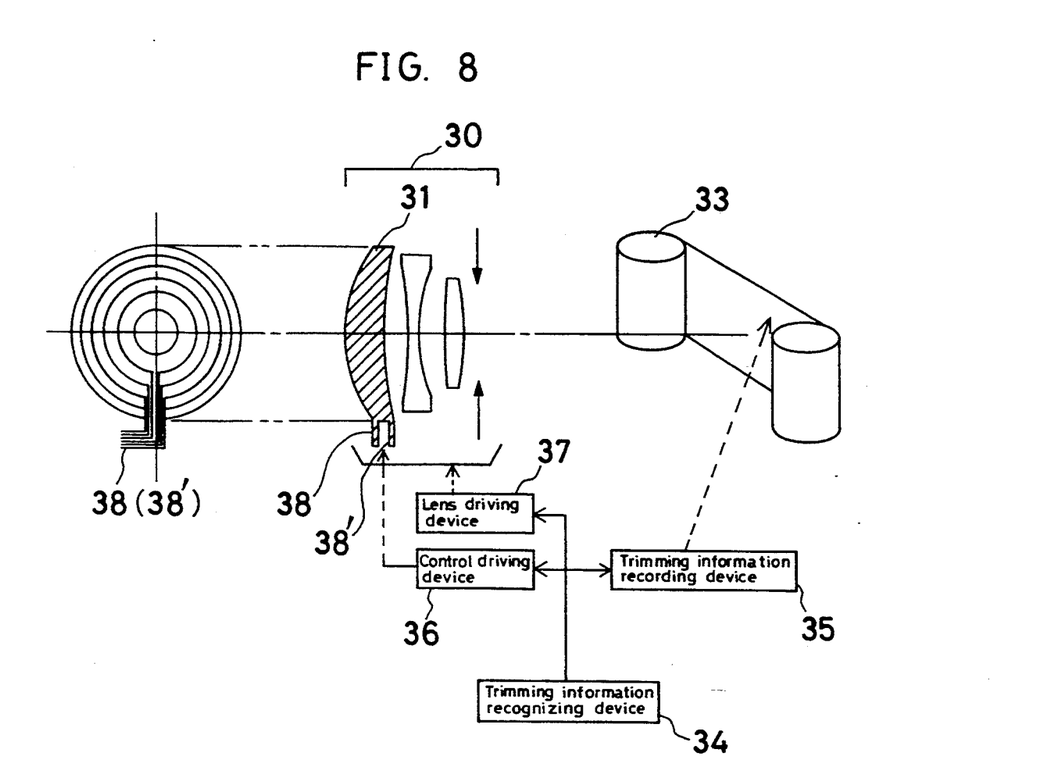
FIG. 8 schematically shows a trimming camera provided with a taking optical system according to a third embodiment of the present invention.

FIG. 8 schematically shows a trimming camera according to a third embodiment of the present invention. The film 33, trimming information recognizing device 34, trimming information recording device 35 and lens driving device 37 of this embodiment function in the same way as the corresponding elements in the second embodiment. The third embodiment differs from the second embodiment in that the taking lens 30 is a triplet having an aperture disposed behind it. The first lens 31 of the triplet, which is closer to the object, is a liquid crystal lens whose refractive index is variable. As shown in the front view at the left-hand side as viewed in FIG. 8, the liquid crystal lens 31 has a structure including a multiplicity of annular portions which are divided concentrically about the optical axis. By controlling the voltage applied to each of annular transparent electrodes 38 or 38' or the current flowing therethrough by the operation of a control driving device 36, the refractive index of the liquid crystal in each annular portion is changed to reduce the axial spherical aberration according to the trimming magnification.

In this embodiment, the control is electrically effected by the use of an annular liquid crystal lens. Therefore, the control mechanism becomes advantageously compact.

Figure 9:
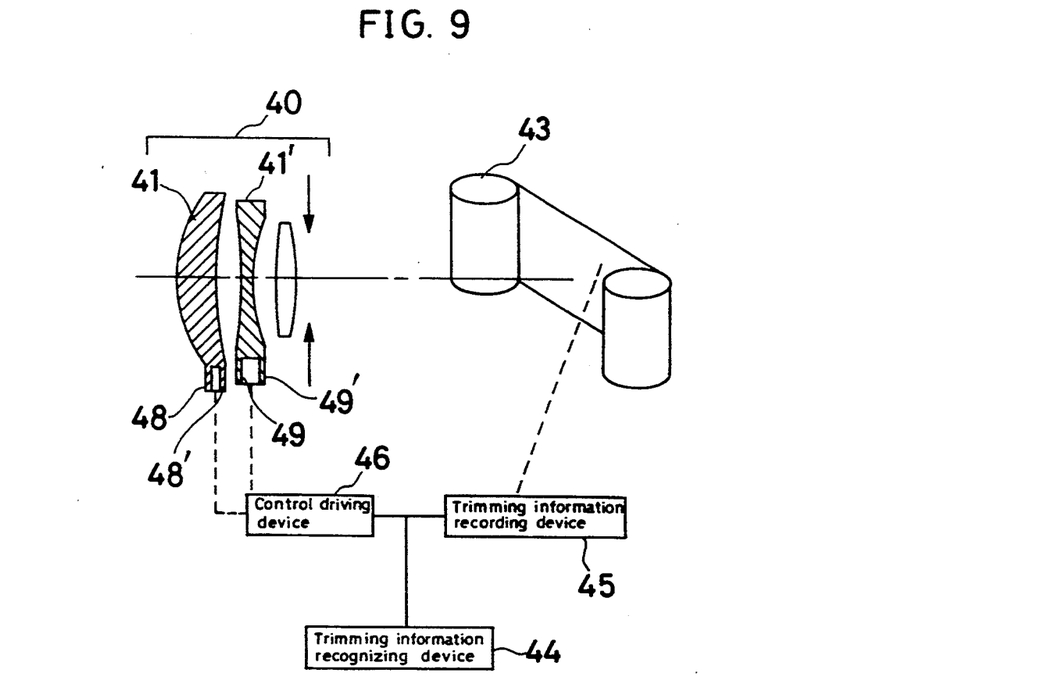
FIG. 9 schematically shows a trimming camera provided with a taking optical system according to a fourth embodiment of the present invention.

FIG. 9 schematically shows a trimming camera according to a fourth embodiment of the present invention. The film 43, trimming information recognizing device 44 and trimming information recording device 45 of this embodiment function in the same way as the corresponding elements in the second and third embodiments. The fourth embodiment differs from the former embodiments in that the taking lens 40 includes a first lens which is closer to the object and comprises a variable refractive index liquid crystal lens sandwiched between transparent electrodes 48 and 48', and a second lens comprising variable refractive index liquid crystal lens 41' sandwiched between transparent electrodes 49 and 49'. In addition, a control driving device 46 changes the refractive indices of the liquid crystal lenses 41 and 41" according to the trimming magnification so as to minimize the axial spherical aberration. Since the control driving device 46 can control the two variable refractive index liquid crystal lenses 41 and 41' it is possible to adjust not only the axial spherical aberration but also either or both of the focal length and back focus, which are paraxial quantities. Thus, it is possible to prevent displacement of the best image surface from the film plane. Accordingly, it is unnecessary to provide a lens driving device for correcting the position of the best image surface. Therefore, the trimming camera can be made correspondingly compact, and the cost can also be lowered.

Although the taking optical system capable of trimming photography according to the present invention and the trimming camera employing the same have been described by way of some embodiments, it should be noted that the present invention is not necessarily limited to the described embodiments and that various changes and modifications may be imparted thereto.

As has been detailed above, the taking optical system capable of trimming photography according to the present invention enables aberrations, particularly spherical aberration, to be corrected in a well-balanced manner in a given trimming range by changing the lens spacing or adjusting at least one of the surface configuration, refractive index and refractive index distribution of an optical element in the taking lens during trimming photography. Accordingly, it is possible to realize trimming photography of good image quality. In addition, if a single lens spacing is changed to make aberration correction, a converging (or diverging) lens system is disposed in front of the spacing, and this converging (or diverging) lens system alone is moved to attain the object of the present invention. Accordingly, the driving mechanism can be simplified. If the surface configuration or other constituent element of the optical element is adjusted to make aberration correction, the resolving power on the film can be improved by adjusting the axial spherical aberration without increasing the overall size of the camera and without the need for changing the F-number according to the trimming magnification. Thus, it is possible to minimize the lowering of resolving power on the print and hence realize trimming photography of good image quality.

What we claim is:

1. A taking optical system capable of trimming photography, comprising a plurality of lens groups arranged to enable at least two photography modes to be changed over from one to the other, said photography modes including a first mode in which a first image forming area is set for photography, and a second mode in which a second image forming area smaller than said first image forming area is set for photography, wherein when the photography mode shifts from said first mode to said second mode, the spacing between said lens groups is changed so that an angle $\omega_x$ between an axial bundle of rays and an optical axis in said lens spacing and an angle $\omega_k$ between the bundle of rays incident on an image surface and the optical axis satisfy the following relationship, thereby effectively correcting aberrations in said second image forming area:

$$|\sin \omega_x/\sin \omega_k| 1.0.$$

2. A taking optical system capable of trimming photography, comprising:
   a first lens group,
   an aperture, and
   a second lens group,
   wherein said first lens group, said aperture and said second lens group disposed to enable at least two photography modes to be changed over from one to another, said photography modes including a first mode in which a first image forming area is set for photography, and a second mode in which a second image forming area smaller than said first image forming area is set for photography,
   wherein when the photography mode shifts from said first mode to said second mode, at least one lens spacing in the first lens group is changed, and at least one spacing in the second lens group is changed, thereby effectively correcting aberrations in said second image forming area.

3. A taking optical system according to claim 2 wherein an angle $\omega_x$ between an axial bundle of rays and an optical axis in said lens spacings and an angle $\omega_k$ between the bundle of rays incident on an image surface and the optical axis satisfy the following relationship:

$$|\sin \omega_x/\sin \omega_k| > 0.1.$$

4. A taking optical system according to claim 2 or 3, wherein an angle $\omega_x$ between an axial bundle of rays and an optical axis in said lens spacings and an angle $\omega_k$ between the bundle of rays incident on an image surface and the optical axis satisfy the following relationship:

$$|\sin \omega_x/\sin \omega_k| > 1.0.$$

* * * * *